United States Patent
Kawai et al.

(10) Patent No.: US 7,901,477 B2
(45) Date of Patent: Mar. 8, 2011

(54) MACHINE TOOL WITH MIST DISPOSAL STRUCTURE

(75) Inventors: Tomohiko Kawai, Yamanashi (JP); Kenzo Ebihara, Yamanashi (JP); Takeshi Ooki, Yamanashi (JP)

(73) Assignee: Fanuc Ltd, Minamitsuru-Gun, Yamanashi (JP)

( * ) Notice: Subject to any disclaimer, the term of this patent is extended or adjusted under 35 U.S.C. 154(b) by 370 days.

(21) Appl. No.: 12/128,031

(22) Filed: May 28, 2008

(65) Prior Publication Data
US 2008/0314004 A1  Dec. 25, 2008

(30) Foreign Application Priority Data

Jun. 25, 2007 (JP) ................................ 2007-165934

(51) Int. Cl.
*B01D 50/00* (2006.01)
(52) U.S. Cl. .................................. 55/385.1; 55/DIG. 18
(58) Field of Classification Search .................. 55/385.1, 55/502, DIG. 17, DIG. 34, DIG. 18, 385.2; 96/417, 420; 74/813 R; 277/346, 351, 353, 277/355, 412, 417, 421; 409/231, 233, 135; 236/1 C; 700/300; 408/60, 61; 165/206, 165/294; 82/900
See application file for complete search history.

(56) References Cited

U.S. PATENT DOCUMENTS

| 3,187,609 A | | 6/1965 | Stephan |
| 3,877,547 A | * | 4/1975 | Willuweit et al. ............ 184/6.26 |
| 4,129,291 A | | 12/1978 | Kato et al. |
| 4,290,610 A | * | 9/1981 | Lizogub et al. ............... 277/417 |
| 5,472,367 A | * | 12/1995 | Slocum et al. ..................... 451/5 |
| 6,241,252 B1 | * | 6/2001 | Jump et al. ..................... 277/353 |
| 6,502,824 B2 | * | 1/2003 | Mayer et al. .................. 277/355 |
| 2002/0074730 A1 | * | 6/2002 | Mayer et al. .................. 277/355 |
| 2006/0034670 A1 | * | 2/2006 | Sugita et al. .................. 409/231 |
| 2007/0087665 A1 | | 4/2007 | Curtis et al. |
| 2007/0266821 A1 | * | 11/2007 | Azumi et al. ............... 74/813 R |
| 2009/0030560 A1 | * | 1/2009 | Kawai et al. .................. 700/300 |

FOREIGN PATENT DOCUMENTS

| EP | 1775070 A1 | 4/2007 |
| JP | 6-45315 | 11/1994 |
| JP | 2002-331439 | 11/2002 |
| JP | 2004-255494 | 9/2004 |

OTHER PUBLICATIONS

EP Search Report for 08104116.2 dated Aug. 27, 2008.

* cited by examiner

*Primary Examiner* — Duane Smith
*Assistant Examiner* — Minh-Chau Pham
(74) *Attorney, Agent, or Firm* — Lowe Hauptman Ham & Berner LLP

(57) ABSTRACT

An interior of a machine tool and a machining area are divided for communication by a labyrinth. The machining area is covered by a cover. Air discharged from an air bearing flows from the machine tool interior into the machining area through the labyrinth. The cover for the machining area is provided with an exhaust unit for discharging the air from the air bearing or a mist produced in the machining area to the outside of the machine tool.

4 Claims, 6 Drawing Sheets

MACHINE TOOL WITH MIST DISPOSAL STRUCTURE

RELATED APPLICATIONS

The present application is based on, and claims priority from, Japanese Application Number 2007-165934, filed Jun. 25, 2007, the disclosure of which is hereby incorporated by reference herein in its entirety.

BACKGROUND OF THE INVENTION

1. Field of the Invention

The present invention relates to a machine tool provided with a mist disposal structure capable of removing a mist in a machining area and preventing the mist from flowing into the interior of the machine tool.

2. Description of the Related Art

In a machine tool, high-accuracy straightness and high rotational accuracy can be realized by the use of an air bearing. The dustproof and waterproof performance of the conventional machine tool using the air bearing can be improved by the use of a labyrinth or several layers of non-contact bellows (e.g., Japanese Patent Application Laid-Open No. 2002-331439). Alternatively, a device for supplying clean air is disposed and used to increase the pressure in the machining area, thereby preventing penetration of a mist (e.g., Japanese Utility Mode Application Laid-Open No. 6-45315). In another arrangement, bearing air delivered from an air bearing is only discharged into the interior of a machine tool, and air supplied to the bearing is not utilized for dustproof and waterproof effects (e.g., Japanese Patent Application Laid-Open No. 2004-255494).

The machine tool that is provided with the air bearing must be improved in dustproof-waterproof performance without ruining its drive performance. The performance of a dustproof-waterproof structure of a drive section can be enhanced by using a non-contact labyrinth or the like. Since the non-contact structure inevitably involves voids, however, it is lower in dustproof-waterproof performance than any other bearing structure.

In high-speed rotation machining, such as milling, a cutting fluid is scattered as a mist in the machining area and sometimes may penetrate the interior of the machine tool through the labyrinth space of the drive section when it is applied to a tool and a workpiece.

SUMMARY OF THE INVENTION

Accordingly, the present invention is intended to prevent a mist produced in a machining area of a machine tool with an air bearing from flowing into the interior of the machine tool.

In an ultra-precision machine for nanometer-order machining, the machining accuracy is influenced by the ambient temperature, so that the temperature in the machining area must be stabilized.

Accordingly, the object of the present invention is to improve a dustproof-waterproof structure of drive sections by utilizing air discharged from the air bearing, quickly removing a mist produced in the machining area, and stabilizing a change of temperature that influences the machining accuracy.

A machine tool according to the present invention has a structure such that a machining area and a machine tool interior are divided for communication by a labyrinth and the machining area is covered by a cover so that air discharged from an air bearing flows from the machine tool interior into the machining area through the labyrinth. In this machine tool, moreover, the cover is provided with an exhaust structure for discharging the air from the air bearing or a mist produced in the machining area to the outside of the machine tool.

Compressed air supplied to the air bearing may be adjusted to a predetermined temperature by a temperature controller.

The exhaust structure may be provided with means for accelerating the air discharged from the air bearing to flow from the machine tool interior into the machining area.

According to the present invention, a machine cover is provided having a sealed structure without a gap, and the internal pressure of the machine tool is increased so that the air discharged from the air bearing can intensively flow from the machine tool interior into the machining area through a space in the labyrinth. The machining area may be provided with an air vent that opens into the atmosphere, whereby a flow of air that is discharged into the atmosphere through the air vent can be created. Thus, the mist produced in the machining area can be prevented from flowing into the machine tool through the labyrinth space.

Further, the temperatures of the airs supplied to and discharged from the air bearing can be kept constant by stabilizing or keeping the supplied air temperature at the predetermined value by means of the temperature controller.

Furthermore, a mist collector is connected to the air vent that is disposed inside the machine tool or in the machining area and opens into the atmosphere, whereby the mist produced in the machining area can be sucked in. Thus, the mist in the machining area can be more efficiently removed or prevented from flowing into the machine tool.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

Figure 1:
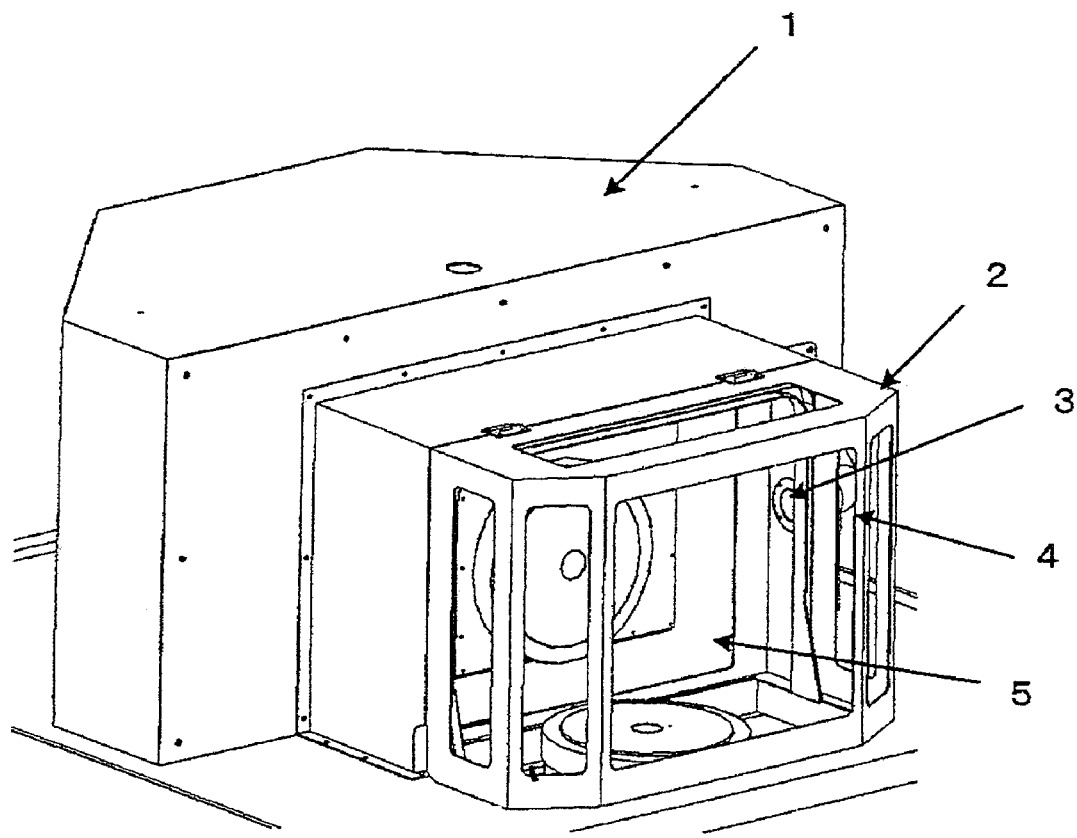
FIG. 1 is a view showing a part of a machine tool in which a machining area is covered by a cover.

FIG. 1 shows a part of a machine tool in which a machining area 5 is covered by a cover 2. The machining area cover 2 that covers the machining area 5 is screwed to a machine cover 1, which covers an interior 6 of the machine tool, with the aid of a rubber gasket. The machine tool interior 6 that is covered by the machine cover 1 is loaded with a shaft drive section including an air bearing and a structure that is furnished with the shaft drive section.

Figure 3:
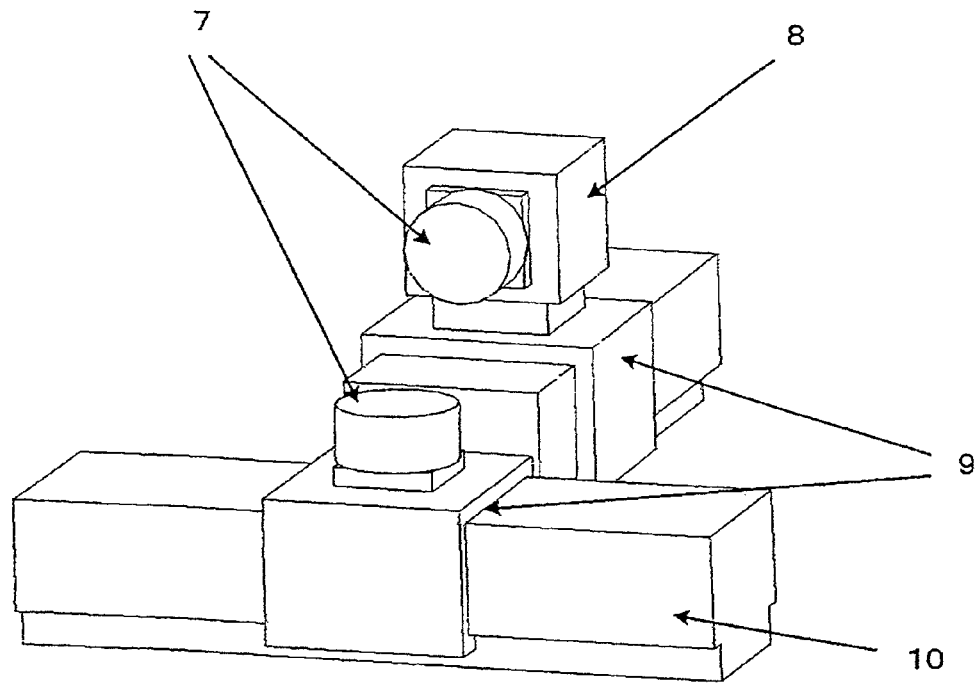
FIG. 3 shows an axis configuration in the machining area of the machine tool and principal parts of drive sections.

As shown in FIG. 3, rotating shaft drive sections 7 are arranged individually in lower and lateral parts of the machining area 5. An air bearing is used in each of these rotating shaft drive sections 7. The machine tool interior 6 and the machining area 5 are divided by a labyrinth (not shown). The machine cover 1 that covers the machine tool interior 6 has a sealed structure besides the labyrinth such that air in the interior 6 never leaks out of the machine tool. Thus, compressed air supplied to the air bearing is discharged and fills the machine tool interior 6, whereupon a pressure difference is caused between the interior 6 and the machining area 5. In consequence, the exhaust of the air bearing flows only from the machine tool interior 6 into the machining area 5 through the labyrinth.

The machining area cover 2 is provided with an air vent 3 through which air in the machining area 5 is discharged to the outside. FIG. 1 illustrates an example in which an air duct 4 is pipe-connected to the air vent 3 from outside the machining area 5. The location of the air vent 3 is not limited to a side surface of the machining area cover 2 shown in FIG. 1. Alternatively, the air vent 3 may be located on a top surface of the cover 2.

Figure 2A:
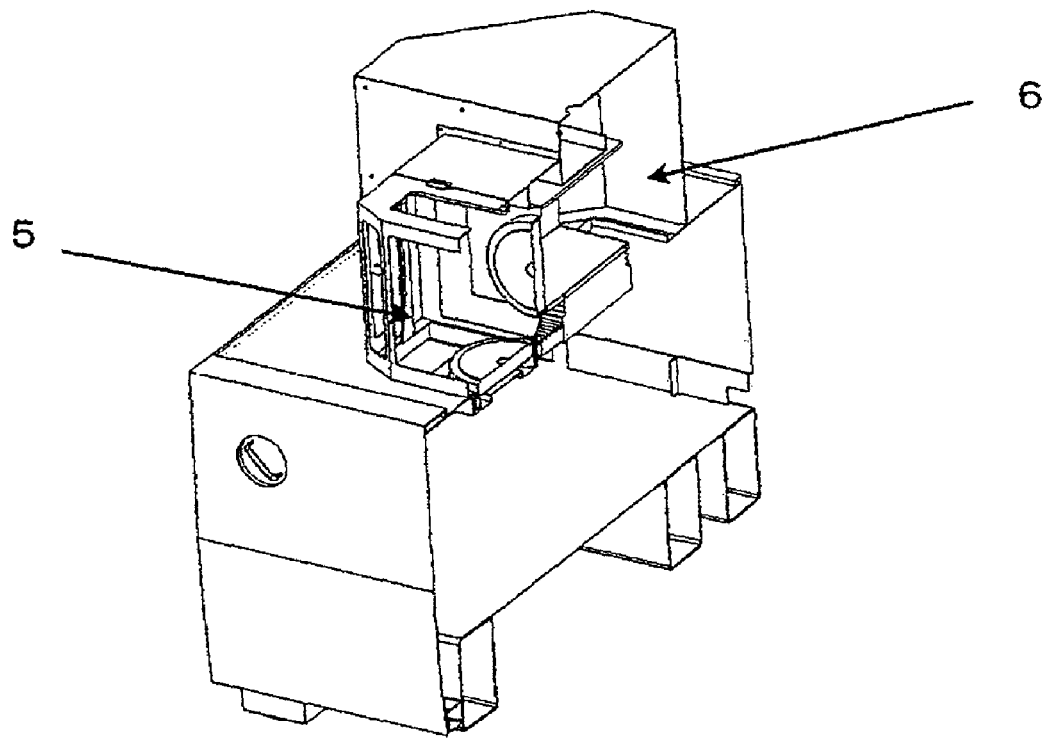
FIG. 2A is a cutaway perspective view of the machine tool with the machining area cover.
Figure 2B:
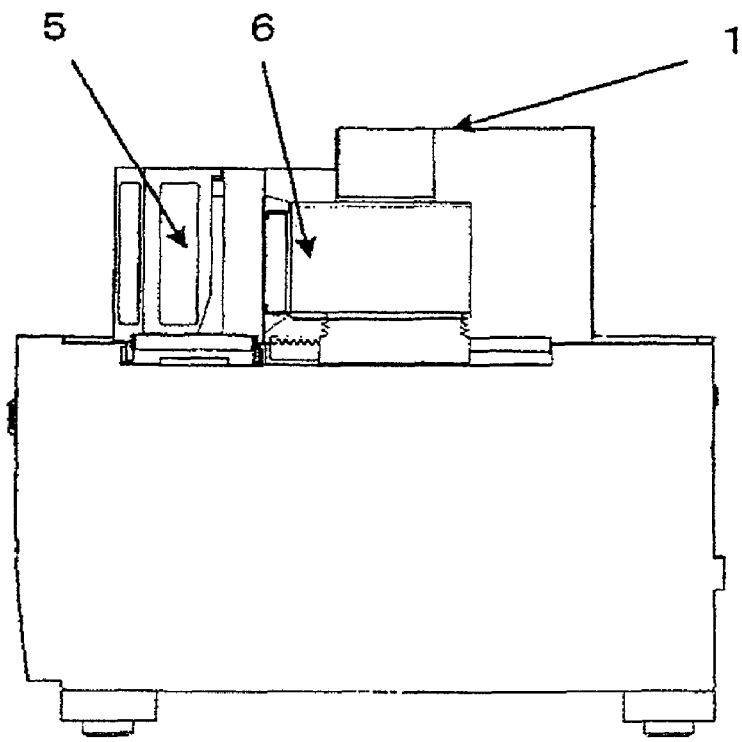
FIG. 2B is a sectional view of the machine tool shown in FIG. 2A.

As shown in FIGS. 2A and 2B, the machining area 5 and the machine tool interior 6 are partially shielded by a flexible sheet or the like.

FIG. 3 shows an axis configuration in the machining area of the machine tool and principal parts of drive sections.

Horizontal-axis drive sections 9 for use as slides are slidably disposed on a guide 10, a fixed section. One of the horizontal-axis drive sections 9 is provided with a vertical-axis drive section 8. The vertical-axis drive section 8 and the horizontal-axis drive sections 9 are provided individually with the rotating shaft drive sections 7 so that five degrees of freedom are secured.

Figure 4:
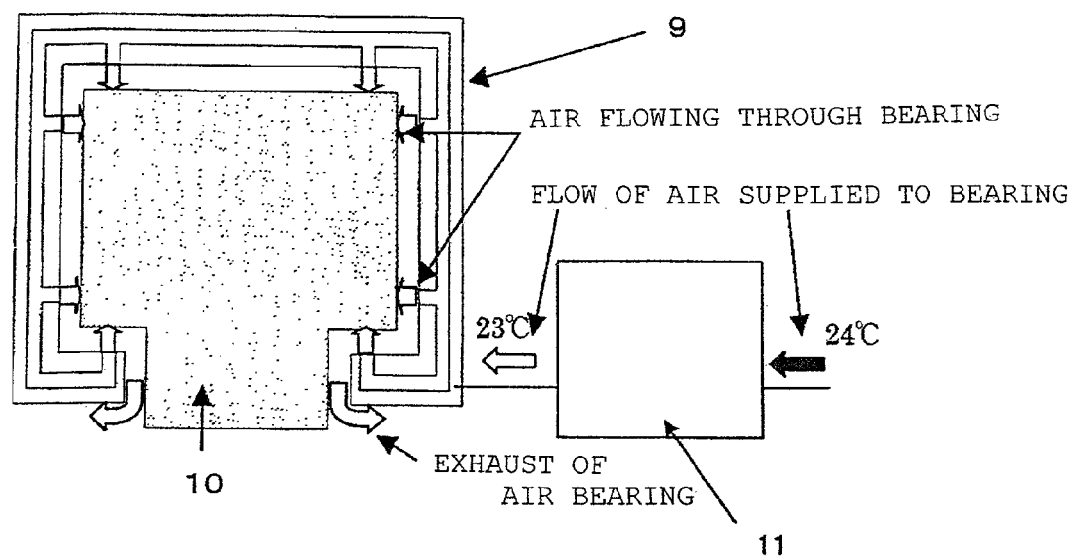
FIG. 4 is a diagram showing a temperature controller for an air bearing and a configuration of the bearing.

FIG. 4 shows a bearing configuration of the slidable air bearing shown in FIG. 3.

The horizontal-axis drive sections 9 externally supply compressed air to the bearing and supply air to the bearing through exhaust ports in those surfaces of the drive sections 9 which face the guide 10. The externally supplied air is fed to the horizontal-axis drive sections 9 after it is adjusted to a predetermined temperature by means of a temperature controller 11. The air fed to the bearing is discharged to the outside of the bearing through gaps between the guide 10 and the drive sections 9.

Figure 5:
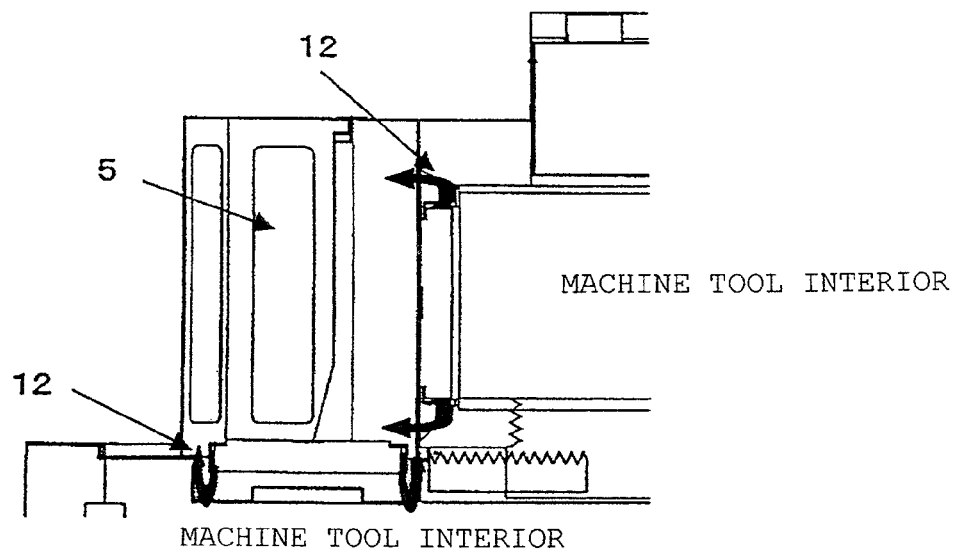
FIG. 5 is a view illustrating flows of air from the interior of the machine tool into the machining area.

FIG. 5 is a view illustrating flows of air from the machine tool interior 6 into the machining area 5.

Arrows shown in FIG. 5 represent flows of air that is discharged from the air bearing and flows from the machine tool interior 6 into the machining area 5. Once the air discharged from the air bearing fills the machine tool interior 6, a pressure difference is caused between the interior 6 and the machining area 5. Since the interior 6 and the machining area 5 communicate with each other through a gap formed by a labyrinth 12, the air discharged from the air bearing can flow through the gap.

Figure 6A:
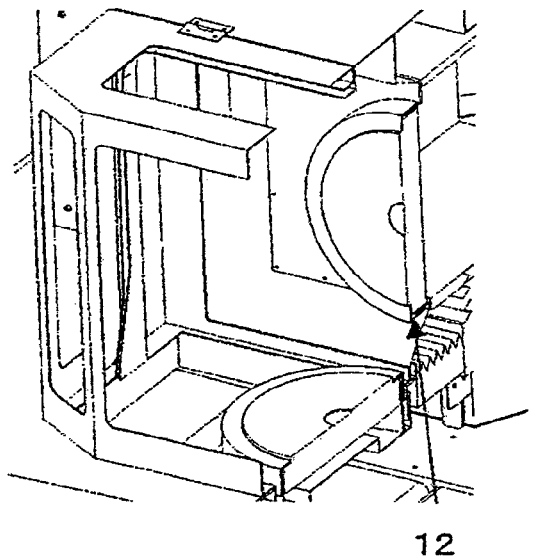
FIG. 6A is a view showing a space or gap through which the machining area and the machine tool interior communicate with each other around a rotating shaft of an air bearing structure.
Figure 6B:
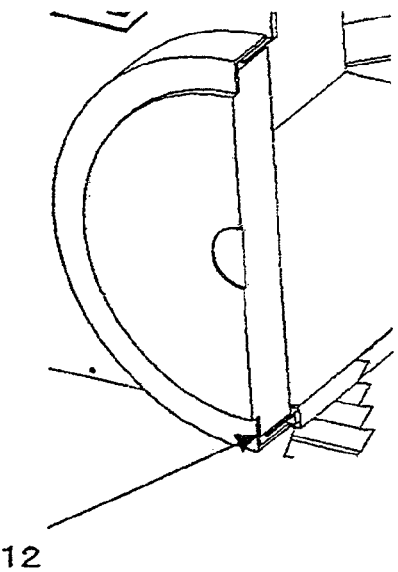
FIG. 6B is a partial enlarged view based on FIG. 6A.

FIG. 6A shows how the machining area 5 and the machine tool interior 6 communicate with each other through a labyrinth space in the peripheral surface of a rotating shaft 14 of an air bearing structure. FIG. 6B is a partial enlarged view.

Figure 7:
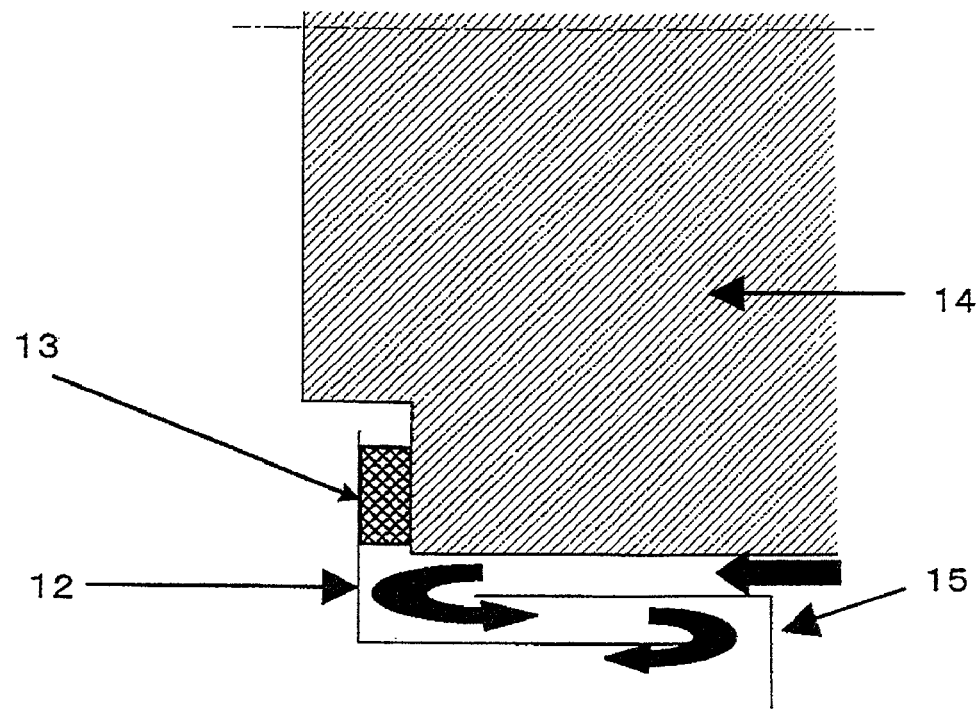
FIG. 7 is a sectional view of the space in which the machine tool interior and the machining area communicate with each other by means of a labyrinth.

FIG. 7 is a partial sectional view of the rotating shaft 14 of the air bearing structure shown in FIG. 6A. The labyrinth 12 is formed on the peripheral surface of the rotating shaft 14. A rubber or sponge gasket 13 is disposed between the rotating shaft 14 and the labyrinth 12 lest the bearing air flow through the machining area 5 without passing through the labyrinth 12.

Figure 8:
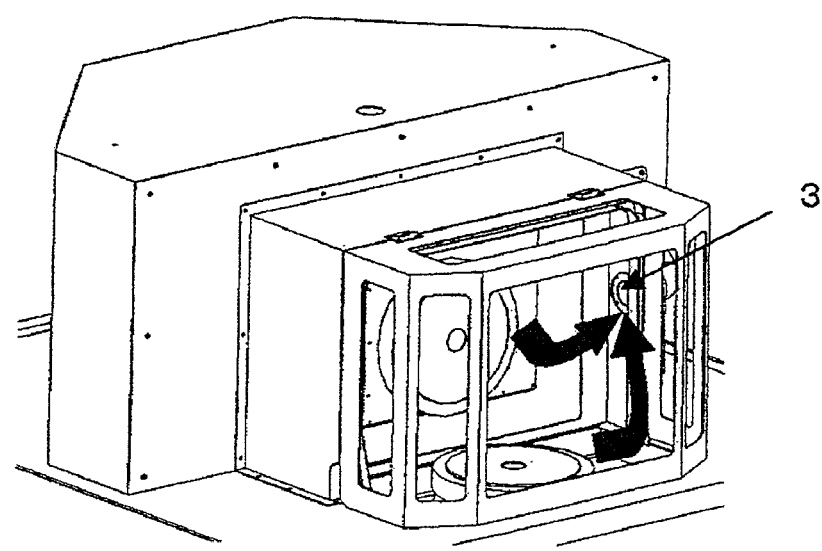
FIG. 8 is a view showing how air or a mist that is introduced from the machine tool interior into the machining area through the labyrinth is discharged from the machining area through an air vent.

FIG. 8 is a view showing how air or a mist that is introduced into the machining area 5 from the machine tool interior 6 through the labyrinth is discharged from the machining area 5 through the air vent 3. By sucking in the mist from the machining area 5 by means of a mist collector that is pipe-connected to the air vent 3 from outside the machining area, moreover, the mist in the machining area can be removed and effectively prevented from flowing into the machine tool interior 6.

Figure 9:
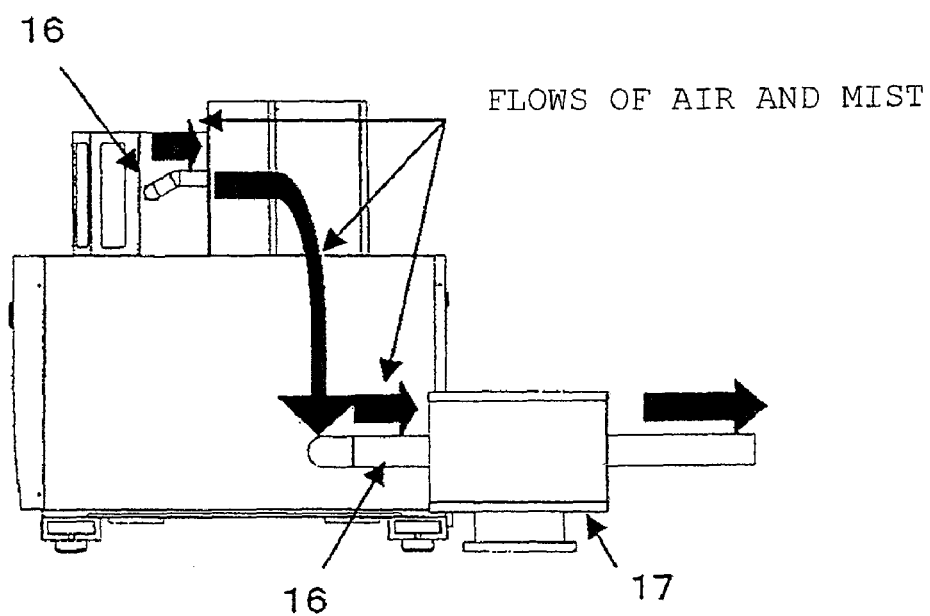
FIG. 9 is a view showing a pipe arrangement and configuration of a mist collector.

FIG. 9 is a view showing how the air or mist collected in the machining area 5 is run through a duct in the machine tool interior 6, recovered by a mist collector 17 located outside the machine tool, and discharged to the outside of a room in which the machine tool is installed.

In the case shown in FIG. 9, a mist collection pipe 16 that is connected to the air vent 3 first extends through the machine tool interior 6 and is then pipe-connected to the mist collector 17 outside the machine tool. Alternatively, however, the mist collection pipe 16 may be pipe-connected to the mist collector 17 through an area outside the machine tool without extending through the machine tool interior 6.

What is claimed is:

1. A machine tool, comprising:
   a machine cover which defines therein a machine tool interior;
   an air bearing in said machine tool interior;
   a machining area cover which covers a machining area outside said machine cover; and
   a labyrinth communicating the machining area and the machine tool interior;
   wherein the machining area and the machine tool interior are divided by the machine cover and are communicated with each other by the labyrinth so that air discharged from the air bearing flows only to the machining area through the labyrinth, and
   wherein the machining area cover is provided with an exhaust structure for discharging the air from the air bearing or a mist produced in the machining area to an outside of the machine tool.

2. The machine tool according to claim 1, further comprising:
   a temperature controller for adjusting compressed air supplied to the air bearing to a predetermined temperature.

3. The machine tool according to claim 1, wherein the exhaust structure is provided with means for accelerating the air discharged from the air bearing to flow from the machine tool interior into the machining area.

4. The machine tool according to claim 1, wherein
   the machine tool interior is sealed by the machine cover,
   the machining area cover is connected to the machine cover by means of a gasket, and
   the air bearing is attached to a horizontal-axis drive section and/or a rotating shaft drive section disposed in the machine tool interior.

* * * * *